(12) United States Patent
Granger et al.

(10) Patent No.: US 7,104,594 B2
(45) Date of Patent: Sep. 12, 2006

(54) ADJUSTABLE REAR FRAME CLADDING

(75) Inventors: Sean Elliot Granger, Detroit, MI (US); John Hobill, Highton (AU); Kevin Bunting, Assandon (AU); Michael Gach, Sterling Heights, MI (US); Adolfo Enrico Milani, Commerce, MI (US); Gary Hawkins, South Lyon, MI (US)

(73) Assignee: Decoma International Inc., Concord (CA)

( * ) Notice: Subject to any disclaimer, the term of this patent is extended or adjusted under 35 U.S.C. 154(b) by 104 days.

(21) Appl. No.: 10/910,137

(22) Filed: Aug. 3, 2004

(65) Prior Publication Data

US 2005/0006927 A1    Jan. 13, 2005

Related U.S. Application Data

(62) Division of application No. 10/381,071, filed on Mar. 19, 2003, now Pat. No. 6,811,210.

(51) Int. Cl.
*B60R 13/02* (2006.01)

(52) U.S. Cl. .................. 296/191; 296/29; 296/193.05; 280/770; 24/297

(58) Field of Classification Search ................ 296/191, 296/193.05, 29; 280/770, 850; 24/297
See application file for complete search history.

(56) References Cited

U.S. PATENT DOCUMENTS

| 4,250,599 | A |   | 2/1981 | Nagashima et al. |
| 4,529,244 | A | * | 7/1985 | Zaydel ....................... 296/191 |
| 5,228,742 | A | * | 7/1993 | Johnson et al. ............. 296/191 |
| 6,095,594 | A | * | 8/2000 | Riddle et al. ................ 296/191 |

FOREIGN PATENT DOCUMENTS

| FR | 1 314 506 | 11/1961 |
| FR | 2 764 349 A1 | 6/1997 |

* cited by examiner

*Primary Examiner*—Joseph D. Pape
(74) *Attorney, Agent, or Firm*—Clark Hill PLC

(57) ABSTRACT

A clip assembly mounts a cladding panel to a body. The clip assembly includes a clip and a key guide. The clip has a head and a shaft. The head is adapted for attaching to a flange of the cladding panel. The key guide has a hollow body sized to receive and retain the shaft in a first and second engagement position. The key guide is configured to be inserted into a slot on the body structure and upon rotation is retained within the slot. One end of the cladding engages the pilot aperture and an opposite end engages a slot. The cladding is adjustable relative to the body structure while in a first engagement position and is held in place for further fastening when in a second engagement position.

7 Claims, 3 Drawing Sheets

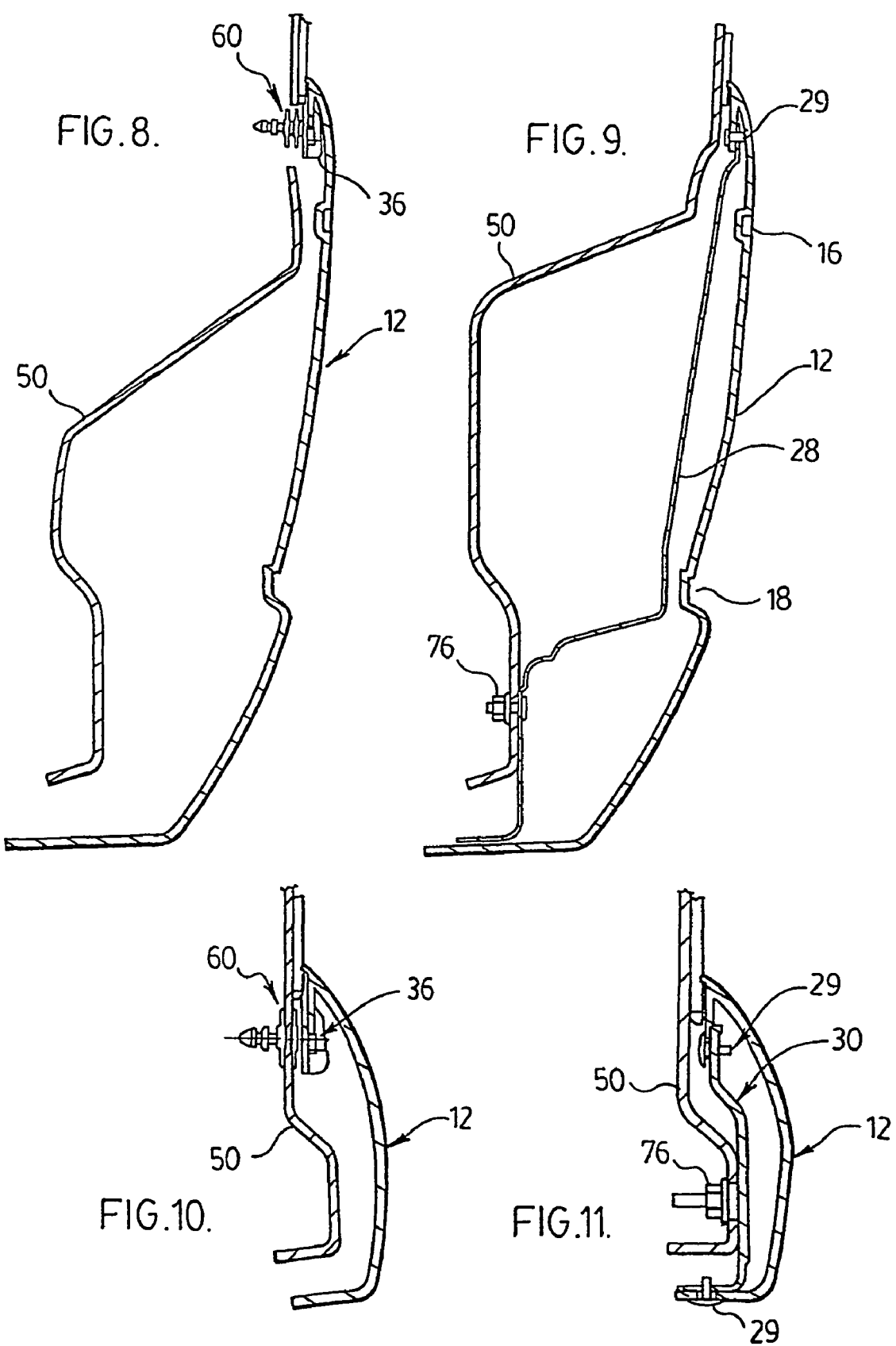

ADJUSTABLE REAR FRAME CLADDING

RELATED APPLICATIONS

This application is a divisional application of U.S. patent application Ser. No. 10/381,071 filed on Mar. 19, 2003 now U.S. Pat. No. 6,811,210.

FIELD OF INVENTION

This invention relates to a clip assembly for adjustably attaching a cladding to a vehicle.

BACKGROUND OF INVENTION

Cladding or panels are commonly used on vehicles. The panels can be made of plastic material or of sheet metal. The panels are attached to the vehicle structure using a variety of methods. If the panel and the structure are compatible, the panels can be welded to the vehicle. However in many cases, the panel is plastic and the vehicle structure is metal requiring the use of adhesives or fasteners.

Claddings are also provided with exterior design features, such as styling lines and trim pieces. The design features must be aligned in order to maintain the aesthetic appearance of the vehicle. Thus, the fasteners must enable the cladding to be adjusted relative to an adjacent panel or cladding.

In the prior art, a number of different fasteners have been used to attach a plastic panel to a metal vehicle structure. Examples of such fasteners include: U.S. Pat. Nos. 4,529,244; 4,607,877 and 5,429,412. Although the prior art fasteners allow a degree of adjustment, the assemblies are relatively complicated to assemble and install on the vehicle.

SUMMARY OF THE INVENTION

The disadvantages of the prior art may be overcome by providing a simple clip assembly which allows the cladding to be easily and quickly installed and then adjusted as desired.

According to one aspect of the invention, there is provided a clip assembly which mounts a cladding panel to a body structure. The clip assembly includes a clip and a key guide. The clip has a head and a shaft. The head is adapted for attaching to a support flange of the cladding panel. The key guide has a hollow body sized to receive and retain the shaft of the clip. The key guide is configured to be inserted into a slot on the body structure and upon rotation is slidably retained within the slot.

According to another aspect of the invention, the body structure is provided with a series of guide slots and a pilot aperture. The guide slots are radially spaced from the pilot aperture and have a major axis which extends tangentially from the radial extent of the pilot aperture enabling the cladding to rotated relative to the body structure about the pilot aperture.

According to another aspect of the invention, there is provided a method of assembling a cladding to sub-assembly to be incorporated into a vehicle. The method includes steps of providing a sub-assembly having a pilot aperture and at least one elongated slot. A key guide is provided into each of the pilot aperture and the at least one elongated slot. A cladding is provided with a support flange. At least two clips are provided on the support flange. The clips are positioned to engage a corresponding one of the key guides. The clips are inserted into the corresponding keys guides to a first engagement position retaining the cladding on the sub-assembly and enabling the cladding to be rotated about the key guide in the pilot aperture, whereafter the cladding can be fixed to the sub-assembly.

DESCRIPTION OF THE DRAWINGS

In drawings which illustrate the embodiments of the present invention,

FIG. 8 is a side sectional view of the attachment of the cladding to the body structure incorporating the present invention;

FIG. 9 is a side sectional view of the attachment of the cladding to the body structure incorporating the present invention;

FIG. 10 is a side sectional view of the attachment of the cladding to the body structure incorporating the present invention; and FIG. 11 is a side sectional view of the attachment of the cladding to the body structure incorporating the present invention.

DETAILED DESCRIPTION OF THE INVENTION

Figure 1:
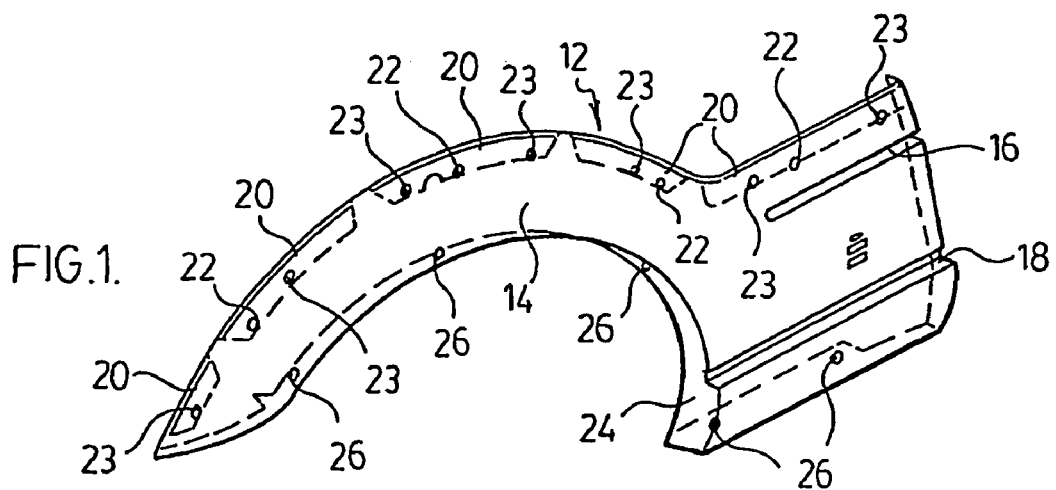
FIG. 1 is a perspective view of a cladding for attachment incorporating the present invention.
Figure 2:
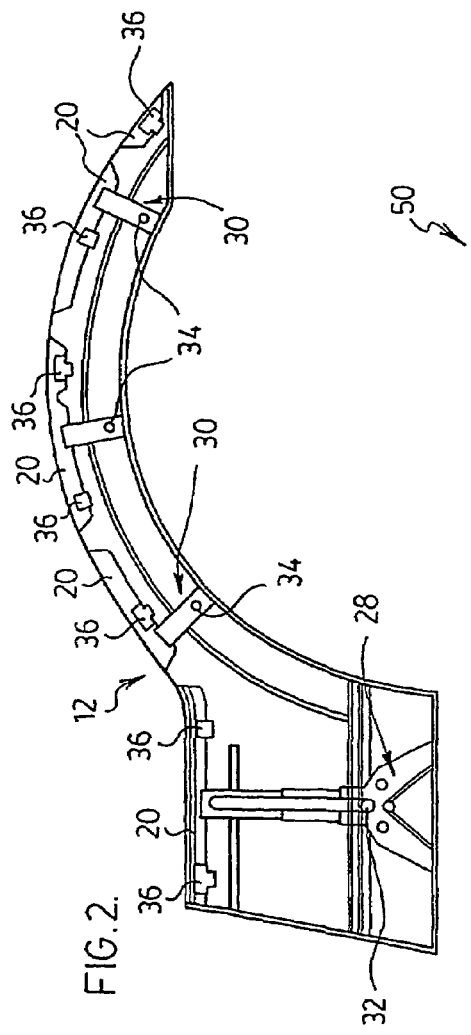
FIG. 2 is a side elevational view of an inner face of the cladding of FIG. 1.

FIGS. 1 and 2 illustrate a typical side body cladding panel 12, such as a wheel flare, which is to be attached to a vehicle body structure utilizing the present invention. The cladding 12 has an exterior class A surface 14 upon which styling considerations are applied. In the present example, a styling line 16 and a contour 18 extend longitudinally to a distal end of the cladding 12. The styling line 16 and contour 18 must align with an adjacent panel with corresponding lines and contours.

Cladding 12 generally has a high aspect ratio, meaning that the height of the cladding 12 is significantly greater than its thickness. Cladding 12 has vertically extending support flanges 20 along an upper periphery. Flanges 20 each have a series of apertures 22 and detents 23. Detent 23 can be in the form of a recess or a through aperture. In the present example, flanges 20 are illustrated as a series of flanges. However, a single continuous flange could also be provided.

The lower periphery of the cladding 12 is provided with a horizontally extending flange 24. Flange 24 is provided with a series of apertures 26.

The inner side of the cladding 12 is provided with a series of mounting brackets 28 and 30. Bracket 28 is preferably an elongate bracket stamped from sheet metal and extends between the lower flange 24 and one of the apertures 22 in the upper flange 20. Similarly, brackets 30 extend from the lower flange 24 to one of the apertures 22 in the upper flange 20. Rivets 29 or other suitable fasteners attach brackets 28, 30 onto cladding 12. Each of the brackets 28 and 30 has a mounting bore 32, 34.

Flange 20 is provided with a series of clips 36 at each detent 23 location.

Figure 3:
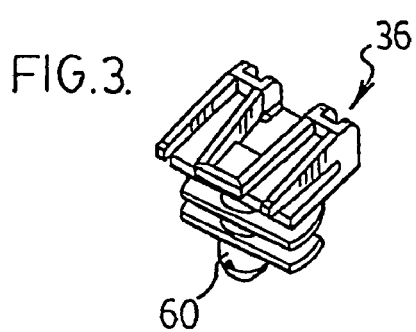
FIG. 3 is a perspective view of a clip assembly of the present invention.
Figure 4:
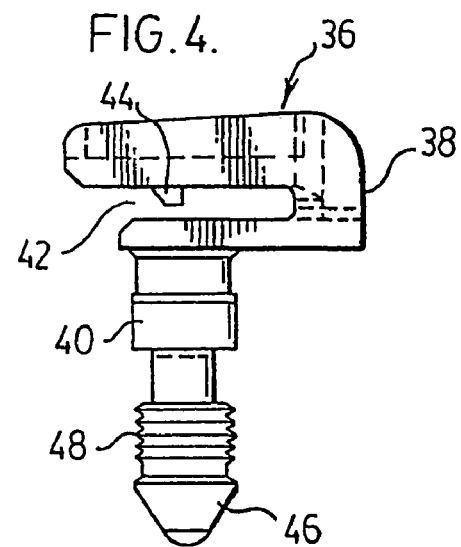
FIG. 4 is a side elevational view of a clip of FIG. 3.

Referring to FIGS. 3 and 4, clip 36 of a clip assembly of the present invention comprises a flange engaging head 38 and a cylindrical shaft 40. Head 38 has a U-shaped slot 42 which extends perpendicular to the shaft 40. Slot 42 is sized to slidingly receive flange 20. Head 38 has an axially extending tab 44 biased to allow engagement of the clip 36 onto flange 20 and to resist removal. Head 38 preferably has a tapered contour and a series of ribs to improve rigidity. Shaft 40 has a conical end 46 and a series of adjacent ridges 48.

Clip 36 is applied to the flange 20 such that tab 44 engages detent 23 for attachment thereto. The head 38 will complementarily fit between the flange 20 and the contour of the cladding 12 opposite class A surface 14. Clip 36 is molded from a NYLON material to be relatively rigid. Once the clip 36 is applied to the flange 20 and tab 44 engages detent 23, clip 36 is firmly attached to the flange 20.

Figure 5:
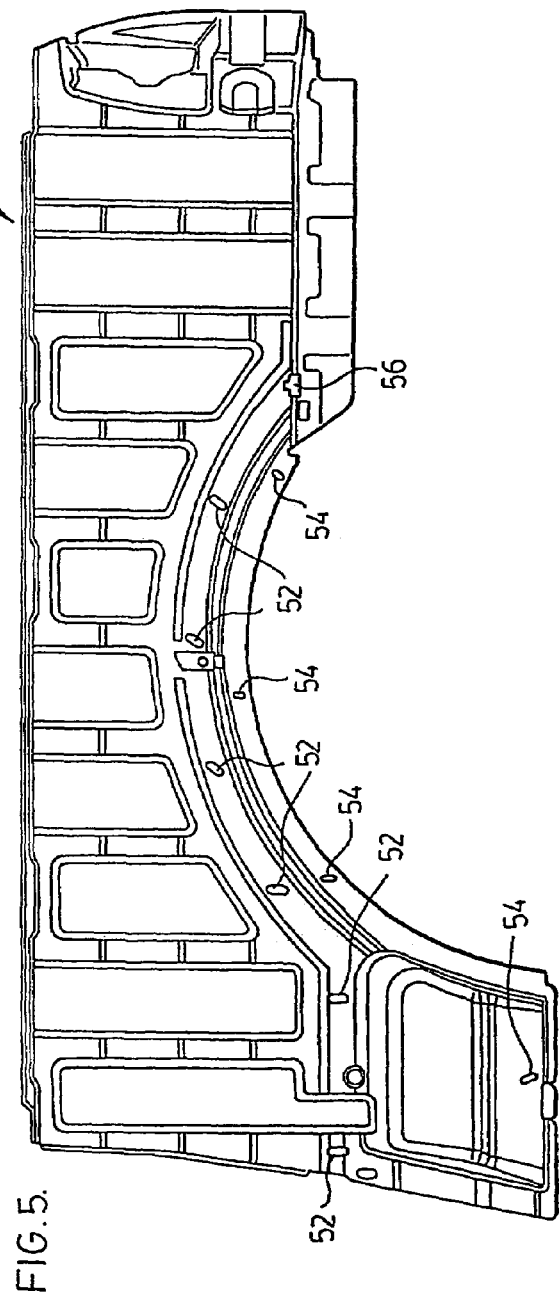
FIG. 5 is a side elevational view of a body structure incorporating the present invention.

Referring to FIG. 5, a typical body structure 50 is illustrated. In the present example, the body structure 50 is a quarter panel of a pick up truck bed. At the location where the cladding 12 is to be mounted, the body 50 is provided with a series of guide slots 52, fastening slots 54 and a pilot aperture 56. Guide slots 52 and fastening slots 54 each has a major axis which is longer than its minor axis. The major axis of each of the slots 52, 54 extend tangentially from a center located at pilot aperture 56. In other words, guide slots 52 and fastening slots 54 are radially spaced from pilot aperture 56. Pilot aperture 56 has a rectangular outline with an arcuate lobe extending perpendicular to the major axis of the rectangular outline. Preferably, pilot aperture 56 is located to receive an end of the cladding 12 that does not require adjustment.

Figure 6:
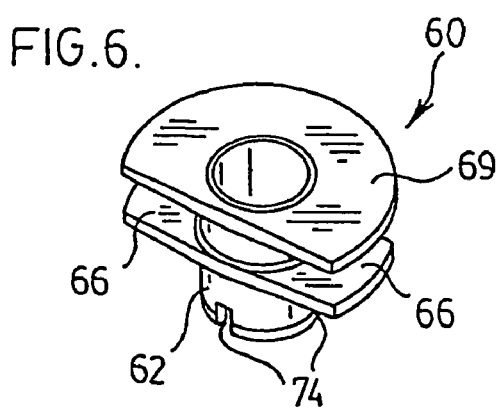
FIG. 6 is a perspective view of a key guide of FIG. 3.
Figure 7:
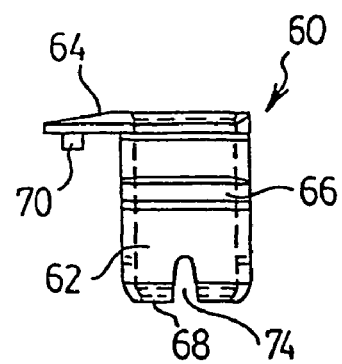
FIG. 7 is a side elevation view of the key guide of FIG. 6.

Referring to FIGS. 6 and 7, a key slide 60 of the clip assembly of the present invention is illustrated. Key slide 60 is preferably injection molded from a NYLON material and has a tubular body 62, a head 64, winglets 66, end 68, cap 69 and a tab 70.

Tubular body 62 has an inner diameter sized to receive shaft 40 of clip 36. End 68 is tapered to frictionally engage ridges 48 of clip 36. End 68 has a series of slots 74 increasing flexibility and biasing the end 68 to enable insertion and resist removal of the clip 36. Cap 69 is shaped to be slightly concave.

Head 64 is truncated along a chord extending from the outer diameter of the body 62. Opposite the truncated side and extending axially is tab 70. Tab 70 is sized to fit within the width (minor axis) of guide slots 52 and pilot slot 56. Head 64 can be any non-circular shape so that the installer can visually confirm that the key guide has been rotated into position.

Winglets 66 extend diametrically from opposite sides of the body 62 and are sized to be inserted through guide slots 52. Winglets 66 are spaced from the head 64 a distance approximating the thickness of the body structure 50. The concavity of cap 69 will slightly bias the key slide 60 into frictional engagement once installed on the body structure 50.

Key slides 60 are slidingly attached to the body structure 50 by first presenting the body 62 into the guide slot 52. Winglets 66 are then aligned with the major axis of the guide slots so that the winglets 66 are inserted therethrough. The key slides 60 are then rotated a ¼ turn until the tab 70 snaps into the guide slot 52 retaining the key slides 60 on the body structure 50. Key slides 60 are thus able to slide along the major axis of the guide slots 52.

Key slide 60 is applied to the pilot slot 56 in a similar manner. However, the size of the lobe of pilot aperture 56 is such that the tab 70 of the key slide 60 snaps into place once the key slide 60 has been rotated a ¼ turn. Thus, key slide 60 will not move in any direction an appreciable amount.

To install a cladding 12, the cladding 12 is provided with the brackets 28, 30. Clips 36 are applied to the flanges 20 to engage detents 23. The body structure 50 is provided with the key slides 60. The cladding 12 is applied to the body structure 50 by inserting the shafts 40 of clips 36 into the key slides 60 until the ridges 48 initially engages end 68 in a first engagement position. At this point, the cladding 12 pivots about the pilot aperture 56. The distal end with the styling line 16 and contour 18 is moved up or down to align the styling line 16 and contour 18 with the adjacent panel. Once aligned, the cladding 12 can be firmly pressed onto the body structure 50 to move shaft 40 through key slides 60 into a second engagement position holding the cladding 12 relative to the body structure 50. The mounting bores 32, 34 will align with mounting slots 54. The mounting bores 32, 34 and mounting slots 54 are each oversized so that there is a predetermined amount tolerance which accommodates the relative movement. A rivet or other fastener 76 is applied the bores 32, 34 and mounting slots 54 permanently attaching the cladding 12 to the body structure 50.

The clips and assembly method of the present invention is particularly advantageous for modular type assembly methods currently employed in the automotive industry. The panels or claddings may be applied to a sub-assembly at a first location, shipped as a sub-assembly to a second location for final assembly to the vehicle. At the first location, the panels or claddings are applied such that the claddings are still adjustable, yet sufficiently attached to withstand shipping. Once the sub-assembly has been assembled onto the vehicle, the claddings can be adjusted and aligned and then firmly attached to hold the claddings in place. Thereafter, fasteners can be applied to permanently attach the panels to the body structure.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims the invention may be practiced otherwise than as specifically described.

We claim:

1. A clip assembly for adjustable mounting a cladding panel to a body structure, said clip assembly comprising:
   a clip having a head and a shaft, said head having a slot for attaching said clip to a flange of said cladding panel, said head having a tab extending into the slot, said tab biased to enable a sliding engagement of said head with said flange and resist removal therefrom; and
   a key guide having a hollow body sized to receive and retain said shaft in a first and a second engagement positions, said key guide configured to be slidably retained within a slot on the body structure, said cladding being adjustable relative to said body structure while in said first engagement position and said cladding being held in place when in said second engagement position.

2. A clip assembly as claimed in claim 1 wherein said key guide has a head at one end of said hollow body, said head being concavely contoured.

3. A clip assembly as claimed in claim 2 wherein said key guide further comprises a pair of winglets extending from said body, said winglets enabling said key guide to be inserted into an aperture and upon rotation of said key guide, said key guide is slidably retained therein.

4. A clip assembly as claimed in claim 3 wherein said key guide has tab positioned to engage said aperture and maintain a predetermined orientation of said key guide relative to said body structure.

5. A clip assembly as claimed in claim 4 wherein said key guide tab extends from said head.

6. A clip assembly as claimed in claim 5 wherein said head has non-circular outline.

7. A clip assembly as claimed in claim 6 wherein said head has a truncated chord outline.

\* \* \* \* \*